(12) United States Patent
Churchill et al.

(10) Patent No.: US 9,224,172 B2
(45) Date of Patent: Dec. 29, 2015

(54) CUSTOMIZABLE CONTENT FOR DISTRIBUTION IN SOCIAL NETWORKS

(75) Inventors: Elizabeth F. Churchill, San Francisco, CA (US); M. Cameron Jones, San Jose, CA (US); Athellina Athsani, San Jose, CA (US)

(73) Assignee: YAHOO! INC., Sunnyvale, CA (US)

( * ) Notice: Subject to any disclaimer, the term of this patent is extended or adjusted under 35 U.S.C. 154(b) by 318 days.

(21) Appl. No.: 12/326,553

(22) Filed: Dec. 2, 2008

(65) Prior Publication Data

US 2010/0138491 A1    Jun. 3, 2010

(51) Int. Cl.
| | |
|---|---|
| G06F 15/16 | (2006.01) |
| G06Q 50/00 | (2012.01) |
| G06Q 30/02 | (2012.01) |
| H04W 4/02 | (2009.01) |
| H04L 12/58 | (2006.01) |
| H04W 4/20 | (2009.01) |

(52) U.S. Cl.
CPC ............... G06Q 50/00 (2013.01); G06Q 30/02 (2013.01); G06Q 30/0251 (2013.01); G06Q 30/0261 (2013.01); G06Q 50/01 (2013.01); H04L 12/588 (2013.01); H04L 12/5865 (2013.01); H04W 4/02 (2013.01); H04W 4/206 (2013.01)

(58) Field of Classification Search
CPC ... G06Q 50/00; G06Q 50/01; G06Q 30/0251; G06Q 30/0261; G06Q 30/02; H04W 4/02; H04W 4/206; H04L 12/588; H04L 12/5865
USPC ......................................... 709/204
See application file for complete search history.

(56) References Cited

U.S. PATENT DOCUMENTS

| | | |
|---|---|---|
| 5,446,891 A | 8/1995 | Kaplan et al. |
| 5,493,692 A | 2/1996 | Theimer et al. |
| 5,583,763 A | 12/1996 | Atcheson et al. |
| 5,651,068 A | 7/1997 | Klemba et al. |
| 5,761,662 A | 6/1998 | Dasan |
| 5,764,906 A | 6/1998 | Edelstein et al. |
| 5,781,879 A | 7/1998 | Arnold et al. |
| 5,784,365 A | 7/1998 | Ikeda |
| 5,794,210 A | 8/1998 | Goldhaber et al. |
| 5,802,510 A | 9/1998 | Jones |
| 5,835,087 A | 11/1998 | Herz |
| 5,903,848 A | 5/1999 | Takahashi |
| 5,920,854 A | 7/1999 | Kirsch et al. |

(Continued)

FOREIGN PATENT DOCUMENTS

| | | |
|---|---|---|
| CN | 101238730 A | 8/2008 |
| EP | 1362302 | 11/2003 |

(Continued)

OTHER PUBLICATIONS

International Search report for PCT/US2009/055505, Apr. 9, 2010.

(Continued)

*Primary Examiner* — Blake Rubin
(74) *Attorney, Agent, or Firm* — James J. DeCarlo; Greenberg Traurig, LLP

(57) ABSTRACT

Particular embodiments of the present invention are related to customizing content based on a social context associated with the viewer of the content. The social context may include information regarding the viewer's friends or contacts in a social network, and information regarding the interaction of such friends or contacts with the customizable content.

17 Claims, 5 Drawing Sheets

(56) References Cited

U.S. PATENT DOCUMENTS

| | | |
|---|---|---|
| 6,014,638 A | 1/2000 | Burge et al. |
| 6,021,403 A | 2/2000 | Horvitz et al. |
| 6,047,234 A | 4/2000 | Cherveny et al. |
| 6,098,065 A | 8/2000 | Skillen et al. |
| 6,112,181 A | 8/2000 | Shear et al. |
| 6,157,924 A | 12/2000 | Austin |
| 6,169,992 B1 | 1/2001 | Beall et al. |
| 6,212,552 B1 | 4/2001 | Biliris et al. |
| 6,266,667 B1 | 7/2001 | Olsson |
| 6,314,365 B1 | 11/2001 | Smith |
| 6,314,399 B1 | 11/2001 | Deligne et al. |
| 6,324,519 B1 | 11/2001 | Eldering |
| 6,327,590 B1 | 12/2001 | Chidlovskii et al. |
| 6,446,065 B1 | 9/2002 | Nishioka et al. |
| 6,490,698 B1 | 12/2002 | Horvitz et al. |
| 6,502,033 B1 | 12/2002 | Phuyal |
| 6,523,172 B1 | 2/2003 | Martinez-Guerra et al. |
| 6,571,279 B1 | 5/2003 | Herz et al. |
| 6,601,012 B1 | 7/2003 | Horvitz et al. |
| 6,662,195 B1 | 12/2003 | Langseth et al. |
| 6,665,640 B1 | 12/2003 | Bennett et al. |
| 6,694,316 B1 | 2/2004 | Langseth et al. |
| 6,701,311 B2 | 3/2004 | Biebesheimer et al. |
| 6,701,315 B1 | 3/2004 | Austin |
| 6,708,203 B1 | 3/2004 | Maker et al. |
| 6,731,940 B1 | 5/2004 | Nagendran |
| 6,741,980 B1 | 5/2004 | Langseth et al. |
| 6,757,661 B1 | 6/2004 | Blaser et al. |
| 6,773,344 B1 | 8/2004 | Gabai et al. |
| 6,781,920 B2 | 8/2004 | Bates et al. |
| 6,785,670 B1 | 8/2004 | Chiang et al. |
| 6,789,073 B1 | 9/2004 | Lunenfeld |
| 6,813,501 B2 | 11/2004 | Kinnunen et al. |
| 6,816,850 B2 | 11/2004 | Culliss |
| 6,829,333 B1 | 12/2004 | Frazier |
| 6,834,195 B2 | 12/2004 | Brandenberg et al. |
| 6,842,761 B2 | 1/2005 | Diamond et al. |
| 6,845,370 B2 | 1/2005 | Burkey et al. |
| 6,850,252 B1 | 2/2005 | Hoffberg |
| 6,853,913 B2 | 2/2005 | Cherveny et al. |
| 6,853,982 B2 | 2/2005 | Smith et al. |
| 6,882,977 B1 | 4/2005 | Miller |
| 6,904,160 B2 | 6/2005 | Burgess |
| 6,931,254 B1 | 8/2005 | Egner et al. |
| 6,961,660 B2 | 11/2005 | Underbrink et al. |
| 6,961,731 B2 | 11/2005 | Holbrook |
| 6,985,839 B1 | 1/2006 | Motamedi et al. |
| 7,010,492 B1 | 3/2006 | Bassett et al. |
| 7,027,801 B1 | 4/2006 | Hall et al. |
| 7,058,508 B2 | 6/2006 | Combs et al. |
| 7,058,626 B1 | 6/2006 | Pan et al. |
| 7,062,510 B1 | 6/2006 | Eldering |
| 7,065,345 B2 | 6/2006 | Carlton et al. |
| 7,065,483 B2 | 6/2006 | Decary et al. |
| 7,069,308 B2 | 6/2006 | Abrams |
| 7,073,129 B1 | 7/2006 | Robarts et al. |
| 7,110,776 B2 | 9/2006 | Sambin |
| 7,143,091 B2 | 11/2006 | Charnock et al. |
| 7,149,696 B2 | 12/2006 | Shimizu et al. |
| 7,181,438 B1 | 2/2007 | Szabo |
| 7,185,286 B2 | 2/2007 | Zondervan |
| 7,194,512 B1 | 3/2007 | Creemer et al. |
| 7,203,597 B2 | 4/2007 | Sato et al. |
| 7,209,915 B1 | 4/2007 | Taboada et al. |
| 7,219,013 B1 | 5/2007 | Young et al. |
| 7,236,969 B1 | 6/2007 | Skillen et al. |
| 7,254,581 B2 | 8/2007 | Johnson et al. |
| 7,257,570 B2 | 8/2007 | Riise et al. |
| 7,305,445 B2 | 12/2007 | Singh et al. |
| 7,320,025 B1 | 1/2008 | Steinberg et al. |
| 7,343,364 B2 | 3/2008 | Bram et al. |
| 7,395,507 B2 | 7/2008 | Robarts et al. |
| 7,404,084 B2 | 7/2008 | Fransdonk |
| 7,437,312 B2 | 10/2008 | Bhatia et al. |
| 7,451,102 B2 | 11/2008 | Nowak |
| 7,461,168 B1 | 12/2008 | Wan |
| 7,496,548 B1 | 2/2009 | Ershov |
| 7,522,995 B2 | 4/2009 | Nortrup |
| 7,529,811 B2 | 5/2009 | Thompson |
| 7,562,122 B2 | 7/2009 | Oliver et al. |
| 7,577,665 B2 | 8/2009 | Rameer et al. |
| 7,584,215 B2 | 9/2009 | Saari et al. |
| 7,624,104 B2 | 11/2009 | Berkhin et al. |
| 7,624,146 B1 | 11/2009 | Brogne et al. |
| 7,634,465 B2 | 12/2009 | Sareen et al. |
| 7,657,907 B2 | 2/2010 | Fennan et al. |
| 7,681,147 B2 | 3/2010 | Richardson-Bunbury et al. |
| 7,725,492 B2 | 5/2010 | Sittig et al. |
| 7,729,901 B2 | 6/2010 | Richardson-Bunbury et al. |
| 7,769,740 B2 | 8/2010 | Martinez |
| 7,769,745 B2 | 8/2010 | Naaman |
| 7,783,622 B1 | 8/2010 | Vandermolen et al. |
| 7,792,040 B2 | 9/2010 | Nair |
| 7,802,724 B1 | 9/2010 | Nohr |
| 7,822,871 B2 | 10/2010 | Stolorz et al. |
| 7,831,586 B2 | 11/2010 | Reitter et al. |
| 7,865,308 B2 | 1/2011 | Athsani |
| 7,925,708 B2 | 4/2011 | Davis |
| 2001/0013009 A1 | 8/2001 | Greening et al. |
| 2001/0035880 A1 | 11/2001 | Musatov et al. |
| 2001/0047384 A1 | 11/2001 | Croy |
| 2001/0052058 A1 | 12/2001 | Ohran |
| 2002/0014742 A1 | 2/2002 | Conte et al. |
| 2002/0019849 A1 | 2/2002 | Tuvey et al. |
| 2002/0019857 A1 | 2/2002 | Harjanto |
| 2002/0023091 A1 | 2/2002 | Silberberg et al. |
| 2002/0023230 A1 | 2/2002 | Bolnick et al. |
| 2002/0035605 A1 | 3/2002 | McDowell et al. |
| 2002/0049968 A1 | 4/2002 | Wilson et al. |
| 2002/0052786 A1 | 5/2002 | Kim et al. |
| 2002/0052875 A1 | 5/2002 | Smith et al. |
| 2002/0054089 A1 | 5/2002 | Nicholas |
| 2002/0065844 A1 | 5/2002 | Robinson et al. |
| 2002/0069218 A1 | 6/2002 | Sull et al. |
| 2002/0099695 A1 | 7/2002 | Abaijian et al. |
| 2002/0103870 A1 | 8/2002 | Shouji |
| 2002/0111956 A1 | 8/2002 | Yeo et al. |
| 2002/0112035 A1 | 8/2002 | Carey |
| 2002/0133400 A1 | 9/2002 | Terry et al. |
| 2002/0138331 A1 | 9/2002 | Hosea et al. |
| 2002/0152267 A1 | 10/2002 | Lennon |
| 2002/0169840 A1 | 11/2002 | Sheldon et al. |
| 2002/0173971 A1 | 11/2002 | Stirpe et al. |
| 2002/0178161 A1 | 11/2002 | Brezin et al. |
| 2002/0198786 A1 | 12/2002 | Tripp et al. |
| 2003/0008661 A1 | 1/2003 | Joyce et al. |
| 2003/0009367 A1 | 1/2003 | Morrison |
| 2003/0009495 A1 | 1/2003 | Adjaoute |
| 2003/0027558 A1 | 2/2003 | Eisinger |
| 2003/0032409 A1 | 2/2003 | Hutcheson et al. |
| 2003/0033331 A1 | 2/2003 | Sena et al. |
| 2003/0033394 A1 | 2/2003 | Stine et al. |
| 2003/0065762 A1 | 4/2003 | Stolorz et al. |
| 2003/0069877 A1 | 4/2003 | Grefenstette et al. |
| 2003/0069880 A1 | 4/2003 | Harrison et al. |
| 2003/0078978 A1 | 4/2003 | Lardin et al. |
| 2003/0080992 A1 | 5/2003 | Haines |
| 2003/0126250 A1 | 7/2003 | Jhanji |
| 2003/0149574 A1 | 8/2003 | Rudman |
| 2003/0154293 A1 | 8/2003 | Zmolek |
| 2003/0165241 A1 | 9/2003 | Fransdonk |
| 2003/0191816 A1 | 10/2003 | Landress et al. |
| 2004/0010492 A1 | 1/2004 | Zhao et al. |
| 2004/0015588 A1 | 1/2004 | Cotte |
| 2004/0030798 A1 | 2/2004 | Andersson et al. |
| 2004/0034752 A1 | 2/2004 | Ohran |
| 2004/0041836 A1 | 3/2004 | Zaner et al. |
| 2004/0043758 A1 | 3/2004 | Sorvari et al. |
| 2004/0044736 A1 | 3/2004 | Austin-Lane et al. |
| 2004/0070602 A1 | 4/2004 | Kobuya et al. |
| 2004/0139025 A1 | 7/2004 | Coleman |
| 2004/0139047 A1 | 7/2004 | Rechsteiner |
| 2004/0148341 A1 | 7/2004 | Cotte |
| 2004/0152477 A1 | 8/2004 | Wu et al. |

(56) References Cited

U.S. PATENT DOCUMENTS

| | | |
|---|---|---|
| 2004/0183829 A1 | 9/2004 | Kontny et al. |
| 2004/0201683 A1 | 10/2004 | Murashita et al. |
| 2004/0203851 A1 | 10/2004 | Vetro et al. |
| 2004/0203909 A1 | 10/2004 | Koster |
| 2004/0209602 A1 | 10/2004 | Joyce et al. |
| 2004/0243623 A1 | 12/2004 | Ozer et al. |
| 2004/0260804 A1 | 12/2004 | Grabarnik et al. |
| 2004/0267880 A1 | 12/2004 | Patiejunas |
| 2005/0005242 A1 | 1/2005 | Hoyle |
| 2005/0015451 A1 | 1/2005 | Sheldon et al. |
| 2005/0015599 A1 | 1/2005 | Wang et al. |
| 2005/0050027 A1 | 3/2005 | Yeh |
| 2005/0050043 A1 | 3/2005 | Pyhalammi et al. |
| 2005/0055321 A1 | 3/2005 | Fratkina |
| 2005/0060381 A1 | 3/2005 | Huynh et al. |
| 2005/0065950 A1 | 3/2005 | Chaganti et al. |
| 2005/0065980 A1 | 3/2005 | Hyatt et al. |
| 2005/0076060 A1 | 4/2005 | Finn et al. |
| 2005/0086187 A1 | 4/2005 | Grosser et al. |
| 2005/0105552 A1 | 5/2005 | Osterling |
| 2005/0108213 A1 | 5/2005 | Riise et al. |
| 2005/0120006 A1 | 6/2005 | Nye |
| 2005/0131727 A1 | 6/2005 | Sezan et al. |
| 2005/0149397 A1* | 7/2005 | Morgenstern et al. ......... 705/14 |
| 2005/0151849 A1 | 7/2005 | Fitzhugh et al. |
| 2005/0159220 A1 | 7/2005 | Wilson et al. |
| 2005/0159970 A1 | 7/2005 | Buyukkokten et al. |
| 2005/0160080 A1 | 7/2005 | Dawson |
| 2005/0165699 A1 | 7/2005 | Hahn-Carlson |
| 2005/0166240 A1 | 7/2005 | Kim |
| 2005/0171955 A1* | 8/2005 | Hull et al. ...................... 707/10 |
| 2005/0177385 A1 | 8/2005 | Hull et al. |
| 2005/0182824 A1 | 8/2005 | Cotte |
| 2005/0183110 A1 | 8/2005 | Anderson |
| 2005/0187786 A1 | 8/2005 | Tsai |
| 2005/0192025 A1 | 9/2005 | Kaplan |
| 2005/0198031 A1* | 9/2005 | Pezaris et al. ..................... 707/9 |
| 2005/0198305 A1* | 9/2005 | Pezaris et al. ................ 709/227 |
| 2005/0203801 A1 | 9/2005 | Morgenstern et al. |
| 2005/0216295 A1 | 9/2005 | Abrahamsohn |
| 2005/0216300 A1 | 9/2005 | Appelman et al. |
| 2005/0219375 A1 | 10/2005 | Hasegawa et al. |
| 2005/0234781 A1 | 10/2005 | Morgenstern |
| 2005/0256866 A1* | 11/2005 | Lu et al. ............................ 707/5 |
| 2005/0273510 A1 | 12/2005 | Schuh |
| 2006/0020631 A1 | 1/2006 | Cheong Wan et al. |
| 2006/0026013 A1 | 2/2006 | Kraft |
| 2006/0026067 A1 | 2/2006 | Nicholas et al. |
| 2006/0031108 A1 | 2/2006 | Oran |
| 2006/0040719 A1 | 2/2006 | Plimi |
| 2006/0047563 A1 | 3/2006 | Wardell |
| 2006/0047615 A1 | 3/2006 | Ravin |
| 2006/0053058 A1 | 3/2006 | Hotchkiss et al. |
| 2006/0064346 A1* | 3/2006 | Steenstra et al. ................ 705/14 |
| 2006/0069612 A1 | 3/2006 | Hurt et al. |
| 2006/0069616 A1 | 3/2006 | Bau |
| 2006/0069749 A1 | 3/2006 | Herz et al. |
| 2006/0074853 A1 | 4/2006 | Liu et al. |
| 2006/0085392 A1 | 4/2006 | Wang et al. |
| 2006/0085419 A1 | 4/2006 | Rosen |
| 2006/0089876 A1 | 4/2006 | Boys |
| 2006/0116924 A1 | 6/2006 | Angeles et al. |
| 2006/0123053 A1 | 6/2006 | Scannell, Jr. |
| 2006/0129313 A1 | 6/2006 | Becker |
| 2006/0129605 A1 | 6/2006 | Doshi |
| 2006/0143081 A1* | 6/2006 | Argaiz ............................. 705/14 |
| 2006/0161894 A1 | 7/2006 | Oustiougov et al. |
| 2006/0168591 A1 | 7/2006 | Hunsinger et al. |
| 2006/0173838 A1 | 8/2006 | Garg et al. |
| 2006/0173985 A1 | 8/2006 | Moore |
| 2006/0178822 A1 | 8/2006 | Lee |
| 2006/0184508 A1 | 8/2006 | Fuselier et al. |
| 2006/0184579 A1 | 8/2006 | Mills |
| 2006/0212330 A1 | 9/2006 | Savilampi |
| 2006/0212401 A1 | 9/2006 | Amerally et al. |
| 2006/0218577 A1* | 9/2006 | Goodman et al. ............... 725/32 |
| 2006/0227945 A1 | 10/2006 | Runge et al. |
| 2006/0235816 A1 | 10/2006 | Yang et al. |
| 2006/0236257 A1 | 10/2006 | Othmer et al. |
| 2006/0242139 A1 | 10/2006 | Butterfield et al. |
| 2006/0242178 A1 | 10/2006 | Butterfield et al. |
| 2006/0242259 A1 | 10/2006 | Vallath et al. |
| 2006/0248573 A1* | 11/2006 | Pannu et al. ....................... 726/1 |
| 2006/0258368 A1 | 11/2006 | Granito et al. |
| 2006/0271953 A1 | 11/2006 | Jacoby |
| 2006/0271997 A1* | 11/2006 | Jacoby et al. ................. 725/135 |
| 2006/0282455 A1 | 12/2006 | Lee |
| 2007/0005654 A1* | 1/2007 | Schachar et al. ........... 707/104.1 |
| 2007/0013560 A1 | 1/2007 | Casey |
| 2007/0015519 A1 | 1/2007 | Casey |
| 2007/0043766 A1 | 2/2007 | Nicholas et al. |
| 2007/0067104 A1 | 3/2007 | Mays |
| 2007/0067210 A1* | 3/2007 | Rishell et al. ................... 705/10 |
| 2007/0067267 A1 | 3/2007 | Ives |
| 2007/0072591 A1 | 3/2007 | McGary et al. |
| 2007/0073583 A1 | 3/2007 | Grouf et al. |
| 2007/0073641 A1 | 3/2007 | Perry et al. |
| 2007/0086061 A1 | 4/2007 | Robbins |
| 2007/0087756 A1 | 4/2007 | Hoffberg |
| 2007/0088852 A1 | 4/2007 | Levkovitz |
| 2007/0100956 A1 | 5/2007 | Kumar |
| 2007/0112762 A1* | 5/2007 | Brubaker ........................... 707/5 |
| 2007/0121843 A1* | 5/2007 | Atazky et al. ............. 379/114.13 |
| 2007/0130137 A1 | 6/2007 | Oliver et al. |
| 2007/0136048 A1 | 6/2007 | Richardson-Bunbury et al. |
| 2007/0136235 A1 | 6/2007 | Hess |
| 2007/0136256 A1 | 6/2007 | Kapur et al. |
| 2007/0136689 A1 | 6/2007 | Richardson-Bunbury et al. |
| 2007/0143345 A1 | 6/2007 | Jones et al. |
| 2007/0150168 A1 | 6/2007 | Balcom et al. |
| 2007/0150359 A1 | 6/2007 | Lim et al. |
| 2007/0150537 A1* | 6/2007 | Graham ......................... 709/203 |
| 2007/0155411 A1 | 7/2007 | Morrison |
| 2007/0161382 A1 | 7/2007 | Melinger et al. |
| 2007/0162432 A1* | 7/2007 | Armstrong et al. ............... 707/3 |
| 2007/0162850 A1 | 7/2007 | Adler |
| 2007/0168430 A1 | 7/2007 | Brun et al. |
| 2007/0173266 A1 | 7/2007 | Barnes |
| 2007/0179792 A1 | 8/2007 | Kramer |
| 2007/0179863 A1* | 8/2007 | Stoll ................................. 705/26 |
| 2007/0185599 A1 | 8/2007 | Robinson et al. |
| 2007/0192299 A1 | 8/2007 | Zuckerberg et al. |
| 2007/0198506 A1 | 8/2007 | Attaran Rezaei et al. |
| 2007/0198563 A1 | 8/2007 | Apparao et al. |
| 2007/0203591 A1 | 8/2007 | Bowerman |
| 2007/0219708 A1 | 9/2007 | Brasche et al. |
| 2007/0233585 A1 | 10/2007 | Ben Simon et al. |
| 2007/0233736 A1* | 10/2007 | Xiong et al. ............... 707/104.1 |
| 2007/0239348 A1 | 10/2007 | Cheung |
| 2007/0239517 A1 | 10/2007 | Chung et al. |
| 2007/0255807 A1* | 11/2007 | Hayashi et al. ............... 709/219 |
| 2007/0259653 A1 | 11/2007 | Tang et al. |
| 2007/0260508 A1 | 11/2007 | Barry et al. |
| 2007/0260520 A1* | 11/2007 | Jha et al. ......................... 705/14 |
| 2007/0260604 A1 | 11/2007 | Haeuser et al. |
| 2007/0266097 A1* | 11/2007 | Harik et al. ................... 709/204 |
| 2007/0271297 A1 | 11/2007 | Jaffe et al. |
| 2007/0271340 A1 | 11/2007 | Goodman et al. |
| 2007/0273758 A1 | 11/2007 | Mendoza et al. |
| 2007/0276940 A1 | 11/2007 | Abraham et al. |
| 2007/0282621 A1 | 12/2007 | Altman et al. |
| 2007/0282675 A1* | 12/2007 | Varghese ........................ 705/14 |
| 2007/0288278 A1 | 12/2007 | Alexander et al. |
| 2008/0005313 A1 | 1/2008 | Flake et al. |
| 2008/0005651 A1 | 1/2008 | Grefenstette et al. |
| 2008/0010206 A1 | 1/2008 | Coleman |
| 2008/0021957 A1 | 1/2008 | Medved et al. |
| 2008/0026804 A1 | 1/2008 | Baray et al. |
| 2008/0028031 A1 | 1/2008 | Bailey et al. |
| 2008/0040283 A1 | 2/2008 | Morris |
| 2008/0045236 A1* | 2/2008 | Nahon et al. ................ 455/456.1 |
| 2008/0046298 A1 | 2/2008 | Ben-Yehuda et al. |
| 2008/0070588 A1 | 3/2008 | Morin |
| 2008/0086356 A1 | 4/2008 | Glassman et al. |

(56) References Cited

U.S. PATENT DOCUMENTS

| | | | |
|---|---|---|---|
| 2008/0086431 A1 | 4/2008 | Robinson et al. | |
| 2008/0086458 A1* | 4/2008 | Robinson et al. | 707/3 |
| 2008/0091796 A1 | 4/2008 | Story et al. | |
| 2008/0096664 A1 | 4/2008 | Baray et al. | |
| 2008/0102911 A1 | 5/2008 | Campbell et al. | |
| 2008/0104061 A1 | 5/2008 | Rezaei | |
| 2008/0104225 A1* | 5/2008 | Zhang et al. | 709/224 |
| 2008/0104227 A1 | 5/2008 | Birnie et al. | |
| 2008/0109761 A1 | 5/2008 | Stambaugh | |
| 2008/0109843 A1 | 5/2008 | Ullah | |
| 2008/0114751 A1 | 5/2008 | Cramer et al. | |
| 2008/0120183 A1 | 5/2008 | Park | |
| 2008/0120308 A1 | 5/2008 | Martinez et al. | |
| 2008/0120690 A1 | 5/2008 | Norlander et al. | |
| 2008/0126476 A1* | 5/2008 | Nicholas et al. | 709/203 |
| 2008/0132252 A1* | 6/2008 | Altman et al. | 455/457 |
| 2008/0133750 A1 | 6/2008 | Grabarnik et al. | |
| 2008/0147655 A1 | 6/2008 | Sinha et al. | |
| 2008/0147743 A1* | 6/2008 | Taylor et al. | 707/104.1 |
| 2008/0148175 A1 | 6/2008 | Naaman et al. | |
| 2008/0154720 A1 | 6/2008 | Gounares | |
| 2008/0163284 A1 | 7/2008 | Martinez et al. | |
| 2008/0172464 A1 | 7/2008 | Thattai | |
| 2008/0172632 A1 | 7/2008 | Stambaugh | |
| 2008/0177706 A1 | 7/2008 | Yuen | |
| 2008/0182563 A1* | 7/2008 | Wugofski et al. | 455/414.2 |
| 2008/0189169 A1* | 8/2008 | Turpin et al. | 705/10 |
| 2008/0195466 A1* | 8/2008 | Wright | 705/14 |
| 2008/0222295 A1* | 9/2008 | Robinson et al. | 709/227 |
| 2008/0255989 A1* | 10/2008 | Altberg et al. | 705/40 |
| 2008/0270579 A1 | 10/2008 | Herz et al. | |
| 2008/0285886 A1 | 11/2008 | Allen | |
| 2008/0294663 A1* | 11/2008 | Heinley et al. | 707/100 |
| 2008/0294678 A1* | 11/2008 | Gorman et al. | 707/102 |
| 2008/0301250 A1 | 12/2008 | Hardy et al. | |
| 2008/0320001 A1 | 12/2008 | Gaddam | |
| 2009/0005987 A1 | 1/2009 | Vengroff et al. | |
| 2009/0006336 A1 | 1/2009 | Forstall et al. | |
| 2009/0012934 A1 | 1/2009 | Yerigan | |
| 2009/0012965 A1 | 1/2009 | Franken | |
| 2009/0043844 A1 | 2/2009 | Zimmet et al. | |
| 2009/0044132 A1 | 2/2009 | Combel et al. | |
| 2009/0063254 A1 | 3/2009 | Paul et al. | |
| 2009/0070186 A1 | 3/2009 | Buiten et al. | |
| 2009/0073191 A1 | 3/2009 | Smith et al. | |
| 2009/0076889 A1 | 3/2009 | Jhanji | |
| 2009/0100052 A1 | 4/2009 | Stern et al. | |
| 2009/0106356 A1 | 4/2009 | Brase et al. | |
| 2009/0125517 A1 | 5/2009 | Krishnaswamy et al. | |
| 2009/0132941 A1 | 5/2009 | Pilskalns et al. | |
| 2009/0138348 A1* | 5/2009 | Higgins et al. | 705/14 |
| 2009/0144141 A1 | 6/2009 | Dominowska et al. | |
| 2009/0150501 A1 | 6/2009 | Davis et al. | |
| 2009/0150507 A1 | 6/2009 | Davis et al. | |
| 2009/0165051 A1 | 6/2009 | Armaly | |
| 2009/0171939 A1 | 7/2009 | Athsani et al. | |
| 2009/0177603 A1 | 7/2009 | Honisch | |
| 2009/0187637 A1 | 7/2009 | Wu et al. | |
| 2009/0204484 A1 | 8/2009 | Johnson | |
| 2009/0204672 A1 | 8/2009 | Jetha et al. | |
| 2009/0204676 A1 | 8/2009 | Parkinson et al. | |
| 2009/0216606 A1 | 8/2009 | Coffman et al. | |
| 2009/0216806 A1* | 8/2009 | Feuerstein et al. | 707/104.1 |
| 2009/0222302 A1 | 9/2009 | Higgins | |
| 2009/0222303 A1 | 9/2009 | Higgins | |
| 2009/0234814 A1 | 9/2009 | Boerries et al. | |
| 2009/0234909 A1 | 9/2009 | Strandeil et al. | |
| 2009/0249482 A1 | 10/2009 | Sarathy | |
| 2009/0265431 A1 | 10/2009 | Janie et al. | |
| 2009/0281997 A1 | 11/2009 | Jain | |
| 2009/0299837 A1 | 12/2009 | Steelberg et al. | |
| 2009/0313546 A1 | 12/2009 | Katpelly et al. | |
| 2009/0320047 A1 | 12/2009 | Khan et al. | |
| 2009/0323519 A1 | 12/2009 | Pun | |
| 2009/0328087 A1 | 12/2009 | Higgins et al. | |
| 2010/0002635 A1 | 1/2010 | Eklund | |
| 2010/0014444 A1 | 1/2010 | Ghanadan et al. | |
| 2010/0049852 A1* | 2/2010 | Whitnah et al. | 709/226 |
| 2010/0063993 A1 | 3/2010 | Higgins et al. | |
| 2010/0070368 A1 | 3/2010 | Choi et al. | |
| 2010/0118025 A1 | 5/2010 | Smith et al. | |
| 2010/0125563 A1* | 5/2010 | Nair et al. | 707/709 |
| 2010/0125569 A1 | 5/2010 | Nair et al. | |
| 2010/0125604 A1 | 5/2010 | Martinez et al. | |
| 2010/0125605 A1 | 5/2010 | Nair et al. | |
| 2010/0185642 A1 | 7/2010 | Higgins et al. | |
| 2010/0250359 A1* | 9/2010 | Gillenson et al. | 705/14.25 |
| 2010/0257028 A1* | 10/2010 | Hillerbrand | 705/10 |
| 2013/0066963 A1* | 3/2013 | Odio et al. | 709/204 |

FOREIGN PATENT DOCUMENTS

| | | |
|---|---|---|
| JP | 2002312559 | 10/2002 |
| KR | 1020000036897 | 7/2000 |
| KR | 1020000054319 | 9/2000 |
| KR | 10-2000-0064105 | 11/2000 |
| KR | 1020030049173 | 6/2003 |
| KR | 10-0801662 | 2/2005 |
| KR | 1020060043333 | 5/2006 |
| KR | 102007034094 | 3/2007 |
| KR | 1020070073180 | 7/2007 |
| KR | 1020080048802 | 6/2008 |
| WO | WO2006/116196 | 11/2006 |
| WO | WO 2007/022137 | 2/2007 |
| WO | WO 2007/027453 | 3/2007 |
| WO | WO 2007070358 | 6/2007 |
| WO | WO2007113546 | 10/2007 |

OTHER PUBLICATIONS

U.S. Appl. No. 11/593,668, filed Nov. 6, 2006 for Naaman, et al.
U.S. Appl. No. 11/593,869, filed Nov. 6, 2006 for Naaman, et al.
"Gutenkarte" Book Catalog, 2006 MetaCarta, Inc., www.gutenkarte.org 11pgs.
Baron, N.S. et al. (Aug. 30, 2005). "Tethered or Mobile? Use of Away Messages in Instant Messaging by American College Students," Chapter 20.1 in Mobile Communication, Springer: London, England, 31:293-297.
Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/courses/is202/f04/phone_project/Group7/ >, last visited on Feb. 2, 2010, thirteen pages.
Manguy, L. et al. (2006). "iTour—Packing the World Into Your Mobile Device," Final Presentation from Project Group #6, SIMS 202, Fall 2004 Class, UC Berkley School of Information Management & Systems, located at <http://www2.sims.berkeley.edu/academics/courses/is202/f04/phone_project/Group6/index.h > . . . , last visited on Feb. 2, 2010, ten pages.
Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_project/Group8/about.p . . . ,> last visited on Feb. 2, 2010, seventeen pages.
Wooldridge, M. et al. (2005). "STALK. The Camera-phone Scavenger Hunt!" located at <http://www.stalk.com >, last visited on Dec. 28, 2009, two pages.
www.stalk.com (retrieved on Dec. 29, 2009) pp. 1-2.
Anonymous. (Date Unknown). "CommunityWalk—About," located at <http://www.communitywalk.com/about >, last visited on Mar. 3, 2008, one page.
Anonymous. (Date Unknown). "CommunityWalk Mapping Made Easy," located at <http://www.communitywalk.com/>, last visited on Mar. 3, 2008, one page.
Anonymous. (Date Unknown). "Google Earth User Guide" located at <http://earth.google.com/userguide/v4/>, last visited on Feb. 27, 2008, twelve pages.
Anonymous. (Date Unknown). "Google Earth—Wikipedia, the Free Encyclopedia," located at <http://en.wikipedia.org/wiki/Google_earth >, last visited on Mar. 3, 2008, fourteen pages.

(56) References Cited

OTHER PUBLICATIONS

Anonymous. (Date Unknown). "Google Earth User Guide—Using Image Overlays and 3D Models," located at <http://earth.google.com/userguide/v4/ug_imageoverlays.html >, nine pages.
Anonymous. (Date Unknown). "Google Maps," located at <http://en.wikipedia.org/wiki/Google_maps >, last visited on Feb. 27, 2008, eleven pages.
Anonymous. (Date Unknown). "Live Search Maps," located at <http://en.wikipedia.org/wiki/Windows_live_maps >, last visited on Mar. 3, 2008, six pages.
Anonymous. (Date Unknown). "WikiMapia," located at <http://en.wikipedia.org/wiki/WikiMapia >, last visited on Mar. 3, 2008, three pages.
Anonymous. (2007). "Ask.com Maps & Directions," located at <http://maps.ask.com/maps >, last visited on Mar. 3, 2008, one page.
Anonymous. (2007). "Wayfaring Follow You, Follow Me," located at <http://www.wayfaring.com/>, last visited on Mar. 3, 2008, three pages.
Anonymous. (2008). "Platial the People's Atlas," located at <www.platial.com >, last visited on Mar. 3, 2008, one page.
Anonymous. (2008). "Wikimpaia.org ," located at <http://wikimpaia.org/>, last visited on Mar. 3, 2008, one page.
International Search Report and Written Opinion (PCT/US2009/046258) dated Dec. 23, 2009; 7 pages.
Almieda, R.B. et al. "A Community-Aware Search Engine," WWW2004, New York., NY, May. 17-22, 2004, pp. 413-421.
Anonymous. (Jul. 16, 2006). MyFantasyLeague Fantasy Football League Management—Features, located at <http://web.archive.org/web/20060716072900/www.myfantasyleague.com/features.htm >, last visited on Feb. 10, 2009, four pages.
Anonymous. (Jul. 17, 2006). "Fantasy Football Lineup Analyzer—Tips for Who to Start & Who to Bench each Week," located at http://web.archive.org/web/200607171633529/www.fantasyfootballstarters.com/lineupAnalyzer.jsp>, last visited on Feb. 10, 2009, one page.
Bharat, K. (Date Unknown). "SearchPad: Explicit Capture of Search Context to Support Web Search," located at <http://www9.org/w9cdrom/173/173.html >, last visited Aug. 1, 2007, 13 pages.
Budzik, J. et al. (2000). "User Interactions with Everyday Applications as Context for Just-in-Time Information Access," Proceeding of the 2000 Conference on Intelligent User Interfaces, eight pages.
Finkelstein, L. et al. (2001). "Placing Search in Context: The Concept Revisited," WWW/O, Hong Kong, May 2-5, 2001, pp. 406-414.
Freyne, J. et al. (2004). "Further Experiments on Collaborative Ranking in Community-Based Web Search," Artificial Intelligence Review, pp. 1-23.
Lieberman, H. (1995) "Letizia: An Agent that Assists Web Browsing," Proceedings of the Fourteenth International Joint Conference on Artificial Intelligence, Aug. 20-25, 1995, six pages.
Mitra, M. et al. (1998). "Improving Automatic Query Expansion," Proceedings of the AMC SIGIR, nine pages.
Rhodes, B.J. et al. (1996). "Remembrance Agent: A Continuously Running Automated Information Retrieval System," Proceedings of the First International Conference on the Practical Application of Intelligent Agents and Multi Agent Technology (PAAM), pp. 487-495, located at <http://www.cc.gatech.edu/fac/Thad.Starner/p/032_40_agents&ubicomp/remembrance-agent . . . >, last visited Aug. 1, 2007, six pages.
Sansbury, C. (Sep. 13, 2005). "Yahoo! Widget for BBC Sports News—Scotland," 32. located at <http://widgets.yahoo.com/gallery/view.php?widget=37220 >, last visited on Feb. 7, 2007, one page.
Yahoo! Inc. (Dec. 7, 2005). "Yahoo! Widget Engine 3.0 Reference Manual Version 3.0," 300 pages.
U.S. Appl. No. 12/407,690, filed Mar. 19, 2009; 50 pages.
U.S. Appl. No. 12/407,681, filed Mar. 19, 2009; 56 pages.
International Search Report PCT/US2008/088228 dated Sep. 30, 2009—2 pages.
Written Opinion PCT/US2008/088228 dated Sep. 30, 2009—5 pages.
U.S. Appl. No. 12/409,867, filed Mar. 24, 2009, King.
U.S. Appl. No. 12/540,098, filed Aug. 12, 2009, Martinez.
U.S. Appl. No. 12/536,892, filed Aug. 6, 2009, King.
U.S. Appl. No. 12/540,588, filed Aug. 13, 2009, Tendjoukian.
U.S. Appl. No. 12/015,155, filed Jan. 1, 2006, Higgins.
U.S. Appl. No. 12/180,486, filed Jul. 25, 2008, Higgins.
U.S. Appl. No. 12/180,499, filed Jul. 25, 2008, Higgins.
U.S. Appl. No. 12/015,146, filed Jan. 16, 2008, Higgins.
U.S. Appl. No. 12/041,088, filed Mar. 3, 2008, Higgins.
U.S. Appl. No. 12/041,062, filed Mar. 3, 2008, Higgins.
U.S. Appl. No. 12/041,054, filed Mar. 3, 2008, Higgins.
U.S. Appl. No. 12/540,269, filed Aug. 12, 2009, Kalaboukis.
U.S. Appl. No. 11/969,815, filed Jan. 4, 2004, Davis.
U.S. Appl. No. 12/182,111, filed Jul. 29, 2008, Davis.
U.S. Appl. No. 12/434,575, filed May 1, 2009, O'Sullivan.
U.S. Appl. No. 12/434,580, filed May 1, 2009, O'Sullivan.
U.S. Appl. No. 12/407,690, filed Mar. 19, 2009, Davis.
U.S. Appl. No. 12/407,681, filed Mar. 19, 2009, Athsani.
International Search Report (PCT/US2009/030405) dated Sep. 23, 2009; 2 pages.
U.S. Appl. No. 12/041,054 file history dated Mar. 3, 2008; 64 pgs.
U.S. Appl. No. 12/041,062 file history dated Mar. 3, 2008; 66 pgs.
U.S. Appl. No. 12/041,088 file history dated Mar. 3, 2008; 66 pgs.
U.S. Appl. No. 12/169,931 file history dated Jul. 9, 2008; 66 pgs.
U.S. Appl. No. 12/170,025 file history dated Jul. 9, 2008; 67 pgs.
U.S. Appl. No. 12/180,499 file history dated Jul. 25, 2008; 67 pgs.
U.S. Appl. No. 12/180,486 file history dated Jul. 25, 2008; 65 pgs.
International Search Report PCT/US2009/030406 dated Sep. 29, 2009; 5 pages.
International Search Report and Written Opinion PCT/US2009/034445 dated Oct. 12, 2009; 7 pages.
Office Action U.S. Appl. No. 12/041,054 dated Oct. 27, 2010; 15 pages.
Office Action U.S. Appl. No. 12/041,062 dated Oct. 28, 2010; 12 pages.
International Search Report PCT/US2009/034444 dated Sep. 18, 2009; 2 pages.
Office Action U.S. Appl. No. 12/041,088 dated Oct. 4, 2010; 18 pages.
U.S. Appl. No. 11/617,451, filed Dec. 28, 2006, Kalaboukis.
U.S. Appl. No. 11/562,973, filed Nov. 22, 2006, Martinez.
U.S. Appl. No. 11/562,974, filed Nov. 22, 2006, Martinez.
U.S. Appl. No. 11/562,976, filed Nov. 22, 2006, Martinez.
U.S. Appl. No. 11/562,979, filed Nov. 22, 2006, Martinez.
U.S. Appl. No. 12/237,709, filed Sep. 25, 2008, Martinez.
U.S. Appl. No. 12/399,669, filed Mar. 6, 2009, King.
U.S. Appl. No. 11/353,657, filed Feb. 13, 2006, Mor Naaman.
U.S. Appl. No. 11/437,344, filed May 19, 2006, Jaffe.
U.S. Appl. No. 11/593,869, filed Nov. 6, 2006, Mor Naaman.
U.S. Appl. No. 11/593,668, filed Nov. 6, 2006, Mor Naaman.
Allen James F., "Maintaining Knowledge About Temporal Intervals", Communications of the ACM, Nov. 1983, vol. 26, No. 11 pp. 832-843; 12 pages.
Press Release, "QUALCOMM Conducts First Live Demonstration of FL Technology On A Wireless Handset", Qualcomm Inc., San Diego, Sep. 27, 2005; 3 pages.
MediaFlo, FLO Technology Overview, Qualcomm Inc. Copyright 2007; 24 pages.
Axup, Jeff et al., "Conceptualizing New Mobile Devices By Observing Gossip and Social Network Formation Amongst the Extremely Mobile", ITEE Technical Report #459, Dec. 19, 2005, pp. 1-71.
Conhaim, Wallys W., "Social networks: the Internet continues to evolve: where is the money in all this? That is what venture capitalists are asking. (Perspectives)", Information Today, 22, 9, 35(2), Oct. 2005.
Davis, Marc et al., "From Context to Content: Leveraging Context to Infer Media Metadata", ACM Press, Oct. 10, 2004, pp. 1-8.
Kaasinen, E., "Behaviour & Information Technology", Taylor & Francis, vol. 24, No. 1, Jan./Feb. 2005, pp. 37-49.
Konomi, Shin'ichi et al., "Supporting Colocated Interactions Using RFID and Social Network Displays", Pervasive Computing, Jul.-Sep. 2006, vol. 5, No. 3, pp. 48-56.

(56) References Cited

OTHER PUBLICATIONS

Lin, F. et al., "A unified framework for managing Web-based services.", Information Systems and e-Business Management, vol. 3, Oct. 2005, p. 299.
Metz, Cade, "MySpace Nation", PC Magazine, Jun. 21, 2006.
Perkowitz, Mike et al., "Utilizing Online Communities to Facilitate Physical World Interactions", The International Conference on Communities and Technologies, Sep. 19, 2003, Amsterdam, pp. 1 6.
Roush, Wade, "Social Machines", Continuous Computing Blog, Jul. 5, 2005, pp. 1-21.
Roush, Wade, "Social Machines", Technology Review, Aug. 2005, pp. 45-51.
Sheppard, Brett, "The Rights Stuff: The Integration of Enterprise Digital Rights Management Into an Enterprise Architecture", ECantent, vol. 29, No. 9, Nov. 2006, p. 38, 40-44.
Voight, Joan et al., "Lessons for Today's Digital Market", Adweekcom, Oct. 2, 2006, pp. 1-6.
"Companies add new communication features to photo sharing.", Digital Imaging Digest, Feb. 2006, pp. 1-2.
"Dave.tv and Eye Music Network Empower Users to Create Their Own Music TV Channel on Their Sites With New IPTV Channel", www.davenw.com/2006, Sep. 13, 2006, pp. 1-2.
"Digital rights management: a primer: developing a user-friendly means of protecting content.(Profile)", Screen Digest, No. 420, p. 305, Sep. 2006.
"Emerging Markets: What media 2.0 can offer advertisers.", Campaign, Oct. 27, 2006, p. 26.
"Reality Digital Debuts Opus", www.lightreading.com. Sep. 25, 2006, pp. 1.
"Reality Digital—Making Media Move", www.realitydigital.com, Nov. 28, 2006, pp. 1-2.
Notification of Transmittal of The International Search Report and The Written Opinion Of The International Search Authority, Or Declaration (PCT/US2007/'084797) dated Mar. 21, 2008; 11 pages.
International Search Report (PCT/US2007/084807) dated May 27, 2008; 3 pages.
International Preliminary Report on Patentability (PCT/US2007/084807) dated May 26, 2009; 5 pages.
International Search Report (PCT/US2010/026063) dated May 27, 2008; 3 pages.
Rekimoto, et al., "CyberCode: designing augmented reality environments with visual tags." Proceedings of DARE 2000 on Designing augmented reality environments, Elsinore, Denmark, pp. 1-11 Apr. 12-14, 2000.
"Semacode—URL Barcodes—practical ubiquitous computing", located at http://semacode.org visited on Apr. 13, 2007; 3 pages.
"Technical White Paper: Choosing the best 2D barcode format for mobile apps," Semacode, Jul. 15, 2006; pp. 1-7 located at http://semacode.org/about/technical/whitepaper/best2_d_code.pdf.
Carbonell, J. et al. (Aug. 24-28, 1998). "The Use of MMR, Diversity-Based Reranking for Reordering Documents and Producing Summaries," SIGIR '98: Proceedings of the 21 S Annual International ACM SIGIR Conference on Research and Development in Information Retrieval: Melbourne, Australia W.B. Croft et al. eds., pp. 335-336.
Cooper, M. et al. (Nov. 2-8, 2003). "Temporal Event Clustering for Digital Photo Collections," MM'03 Berkeley, California, pp. 364-373.
Davis, M. et al. (Oct. 10-16, 2004). "From Context to Content: Leveraging Context to Infer Media Metadata," MM'04 New York, New York. 9 pages.
Davis, M. et al. "From Context to Content: Leveraging Context for Mobile Media Metadata." 9 pages.
Davis. M. et al. (Apr. 2-7, 2005). "MMM2: Mobile Media Metadata for Media Sharing," CHI 2005 Portland, Oregon. 4 pages.
Davis, M. et al. "Mobile Media Metadata for Mobile Imaging." Jun. 27-30, 2004; 4 pages.
Davis, M. et al. "Using Context and Similarity for Face and Location Identification." 10 pages.
Flickr. "Welcome to Flickr—Photo Sharing," located at <http://www.flickr.com> visited on Feb. 26, 2007, one page.

Gargi, U. (Aug. 7, 2003). "Consumer Media Capture: Time-Based Analysis and Event Clustering," Technical Report HPL-2003-165 HP Laboratories Palo Alto, pp. 1-15.
Goldberger, J. et al. The Hungarian Clustering Method, located at <http://scholar.googles.com/scholar?num=20&h1=en&lr=&9=cache:vbwslsm1CisJ:www.openu .acil/Personal_sites/tamirtassa/Publications/hcm.pdf+goldberger+clustering+method+hungarian> visited on Mar. 1, 2007, twelve pages.
Graham, A. et al. (Jul. 13-17, 2002). Time as Essence for Photo Browsing Through Personal Digital Libraries, JCDL '02 Portland, Oregon. 11 pages.
Jaffe, A. et al. (May 23-26, 2006). "Generating Summaries for Large Collections of Geo-Referenced Photographs," WWW 2006 Edinburgh, Scotland. 2 pages.
Jaffe, A. et al. (Oct. 26-27, 2006). "Generating Summaries and Visualization for Large Collections of Geo-Referenced Photographs," MIR '06 Santa Barbara, California. 11 pages.
Joshi, D. et al. (Oct. 15-16, 2004). "The Story Picturing Engine: Finding Elite Images to Illustrate a Story Using Miitual Reinforcement," MIR '04 New York. 9 pages.
Naaman, M. et al. (Nov. 2003). "From Where to What: Metadata Sharing for Digital Photographs with Geographic Coordinates," In On the Move to Meaningful Internet Systems 2003: Coop/S, DOA, and ODBASE R. Meersman et al. eds., pp. 196-217.
Naaman, M. et al. (Jun. 7-11, 2004). "Automatic Organization for Digital Photographs with Geographic Coordinates" Proceedings of the Fourth ACM/IEEE Joint Conference on Digital Libraries Global Reach and Diverse Impact: Tucson, Arizona, pp. 53-62.
Nair, R. et al. (Nov. 6-11, 2005). "Photo L01: Browsing Multi-User Photo Collections," MM'05 Singapore, pp. 223-224.
0'Hare, N. et al. "Combination of Content Analysis and Context Features for Digital Photograph Retrieval." 7 pages.
Pigeau, A. et al. (Jun. 17, 2005). "Organizing a Personal Image Collection with Statistical Model-Based ICL Clustering on Spatio-Temporal Camera Phone Meta-Data." 25 pages.
Sarvas, R. et al. (Jun. 6-9, 2004). "Metadata Creation System for Mobile Images," MobiSys'04 Boiton, Massachusetts, pp. 36-48.
Toyama, K. et al. (Nov. 2-8, 2003). "Geographic Location Tags on Digital Images," MM '03' Berkeley: California. 12 pages.
U.S. Appl. No. 11/952,007, filed Dec. 6, 2007, Davis.
U.S. Appl. No. 11/958,157, filed Dec. 17, 2007, Hayashi.
U.S. Appl. No. 11/952,875, filed Dec. 7, 2007, Davis.
U.S. Appl. No. 11/960,368, filed Dec. 19, 2007, Madsen.
U.S. Appl. No. 11/953,454, filed Dec. 10, 2007, Davis.
U.S. Appl. No. 11/953,494, filed Dec. 10, 2007, Davis.
U.S. Appl. No. 12/236,668, filed Sep. 24, 2008, Davis.
U.S. Appl. No. 12/059,594, filed Mar. 31, 2008, Martinez.
U.S. Appl. No. 12/057,878, filed Mar. 28, 2008, Martinez.
U.S. Appl. No. 12/057,943, filed Mar. 28, 2008, Martinez.
U.S. Appl. No. 11/969,751, filed Jan. 4, 2008, Martinez.
U.S. Appl. No. 12/145,145, filed Jun. 24, 2008, Davis.
U.S. Appl. No. 12/163,249, filed Jun. 27, 2008, Kalaboukis.
U.S. Appl. No. 12/182,969, filed Jul. 30, 2008, Higgins.
U.S. Appl. No. 12/182,813, filed Jul. 30, 2008, Higgins.
U.S. Appl. No. 12/163,314, filed Jun. 27, 2008, Higgins.
U.S. Appl. No. 12/163,396, filed Jun. 27, 2008, Higgins.
U.S. Appl. No. 12/195,969, filed Aug. 21, 2008, Martinez.
U.S. Appl. No. 12/234,000, filed Sep. 19, 2008, Martinez.
U.S. Appl. No. 12/241,590, filed Sep. 30, 2008, Athsani.
U.S. Appl. No. 12/241,687, filed Sep. 30, 2008, Davis.
U.S. Appl. No. 12/206,172, filed Sep. 8, 2008, Higgins.
U.S. Appl. No. 12/273,291, filed Nov. 18, 2008, Nair.
U.S. Appl. No. 12/273,317, filed Nov. 18, 2008, Nair.
U.S. Appl. No. 12/273,345, filed Nov. 18, 2008, Nair.
U.S. Appl. No. 12/273,259, filed Nov. 18, 2008, Martinez.
U.S. Appl. No. 12/241,198, filed Sep. 30, 2008, Higgins.
U.S. Appl. No. 12/339,355, filed Dec. 19, 2008, Higgins.
U.S. Appl. No. 12/329,038, filed Dec. 5, 2008, Higgins.
U.S. Appl. No. 12/242,656, filed Sep. 30, 2008, Burgener.
U.S. Appl. No. 12/273,371, filed Nov. 18, 2008, Nair.
U.S. Appl. No. 12/357,311, filed Jan. 21, 2009, Higgins.
U.S. Appl. No. 12/357,332, filed Jan. 21, 2009, Higgins.

(56) References Cited

OTHER PUBLICATIONS

U.S. Appl. No. 12/357,345, filed Jan. 21, 2009, Higgins.
U.S. Appl. No. 12/357,285, filed Jan. 21, 2009, Higgins.
Nedos, A; Singh K., Clarke S, Proximity Based Group Communications for Mobile Ad Hoc Networks; Proximity-Based Group Communication; Global Smart Spaces; D.14; Oct. 3, 2003; 31 pages.
Brunato, M; Battiti R. "Pilgrim: A Location Broker and Mobility-Aware Recommendation System"; Technical report DIT-02-0092, Universita di Trento, Oct. 2002; 8 pages.
Backstrom et al., Spatial Variation in Search Engine Queries, WWW•2008, Beijing, China (Apr. 21-25, 2008).
Gan et al., Analysis of Geographic Queries in a Search Engine Log, LocWeb 2008, Beijing, China (Apr. 22, 2008).
Jones et al., Geographic Intention and Modification in Web Search, International Journal of Geographical Information Science, vol. 22, No. 3, pp. 1-20 (Jul. 2008).
Sanderson et al., Analyzing Geographic Queries; Department of Information Studies; University of Sheffield, UK; 2 pages.
Go With the Flow, The Economist Technology Quarterly, vol. 382, Issue 8519, 4 pages, (Mar. 10, 2007).
International Search Report and Written Opinion (PCT/US2009/060476) dated May 4, 2010; 12 pages.
International Search Report and Written Opinion (PCT/US2009/060374) dated Apr. 30, 2010; 12 pages.
International Search Report (PCT/US2009/060379) dated Apr. 30, 2010; 3 pages.
International Search Report and Written Opinion (PCT/US2008/085135) dated May 25, 2009; 7 pages.
International Search Report (PCT/US2009/055503) dated Apr. 8, 2010; 3 pages.
Written Opinion (PCT/US2008/085915) dated Jun. 29, 2009; 4 pages.
Written Opinion (PCT/US2008/086948) dated May 21, 2009; 5 pages.
International Search Report and Written Opinion (PCT/US2009/051247) dated Jan. 25, 2010; 9 pages.

* cited by examiner

CUSTOMIZABLE CONTENT FOR DISTRIBUTION IN SOCIAL NETWORKS

TECHNICAL FIELD

The present disclosure generally relates to customized advertising systems.

BACKGROUND

As the popularity of the Internet has increased, so has the prevalence of social networking websites and applications. Generally speaking, a social network refers to an application or service that facilitates the building online communities of people who share interests and activities, or who are interested in exploring the interests and activities of others. Many social network services are web-based and provide a variety of ways for users to interact, such as e-mail and instant messaging services. Some examples of social networking websites are delicious (http://delicious.com), facebook (http://www.facebook.com), Yahoo! Movies (http://movies.yahoo.com), Yahoo! Music (http://music.yahoo.com), Flickr (http://www.flickr.com), and others.

Advertisers often leverage social networks to market an increase awareness of their products and services. For example, advertisers often use "viral marketing" which generally refers to marketing techniques that use pre-existing social networks to produce increases in brand awareness or to achieve other marketing objectives (such as product sales) either through word-of-mouth or through self-replicating viral processes, analogous to the spread of pathological and computer viruses. Viral marketing promotions may take many forms, including video clips, interactive Flash games, advergames, ebooks, brandable software, images, or even text messages.

In addition, advertisers often deliver advertising using contextual advertising. Contextual advertising is marketing targeted to the specific individual visiting a website or a page within the website. A contextual advertising system may scan the text of a website for keywords, scan metadata related to the individual (e.g., geographical or other demographic data based on cookies or other metadata associated with the user) and return "personalized" advertisements to the webpage based on such keywords and/or metadata. For example, if the individual is viewing a website pertaining to sports and that website uses contextual advertising, the individual may see advertisements for sports-related companies, such as memorabilia dealers or ticket sellers. In addition, the advertisements may be for such companies physically located in the same geographical region as the individual. Contextual advertising may also be used by search engines to display advertisements on their search results pages based on the keywords in a user's search query.

SUMMARY

The present invention provides methods, apparatuses and systems directed to customizing content based on a social context associated with the viewer of the content. The social context may include information regarding the viewer's friends or contacts in a social network, and information regarding the interaction of such friends or contacts with the customizable content.

DESCRIPTION OF EXAMPLE EMBODIMENT(S)

A. Overview

Particular embodiments of the present invention are related to targeting content (e.g., advertising and/or other content) to an individual based on a social context of the individual. The social context may include the individual's social network profile information (e.g., name, schools attended, favorite teams, favorite music, etc.), the individual's preferences, information regarding the individual's friends or contacts in one or more social networks, and such friends' or contacts' interaction with the particular content. For example, targeted content may be delivered to an individual based upon triggering events and/or other behavior of other users in the individual's social network. As another example, targeted content may be customized, augmented and/or annotated by one or more particular friends or contacts of an individual in a social network, and presented to the individual based on the customizations, augmentations, and/or annotations.

The present invention can be implemented in a variety of manners, as discussed in more detail below. Other implementations of the invention may be practiced without some or all of specific details set forth below. In some instances, well known structures and/or processes have not been described in detail so that the present invention is not unnecessarily obscured.

A. Example Network Environment

Particular implementations of the invention operate in a wide area network environment, such as the Internet, including multiple network addressable systems. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like.

Figure 1:
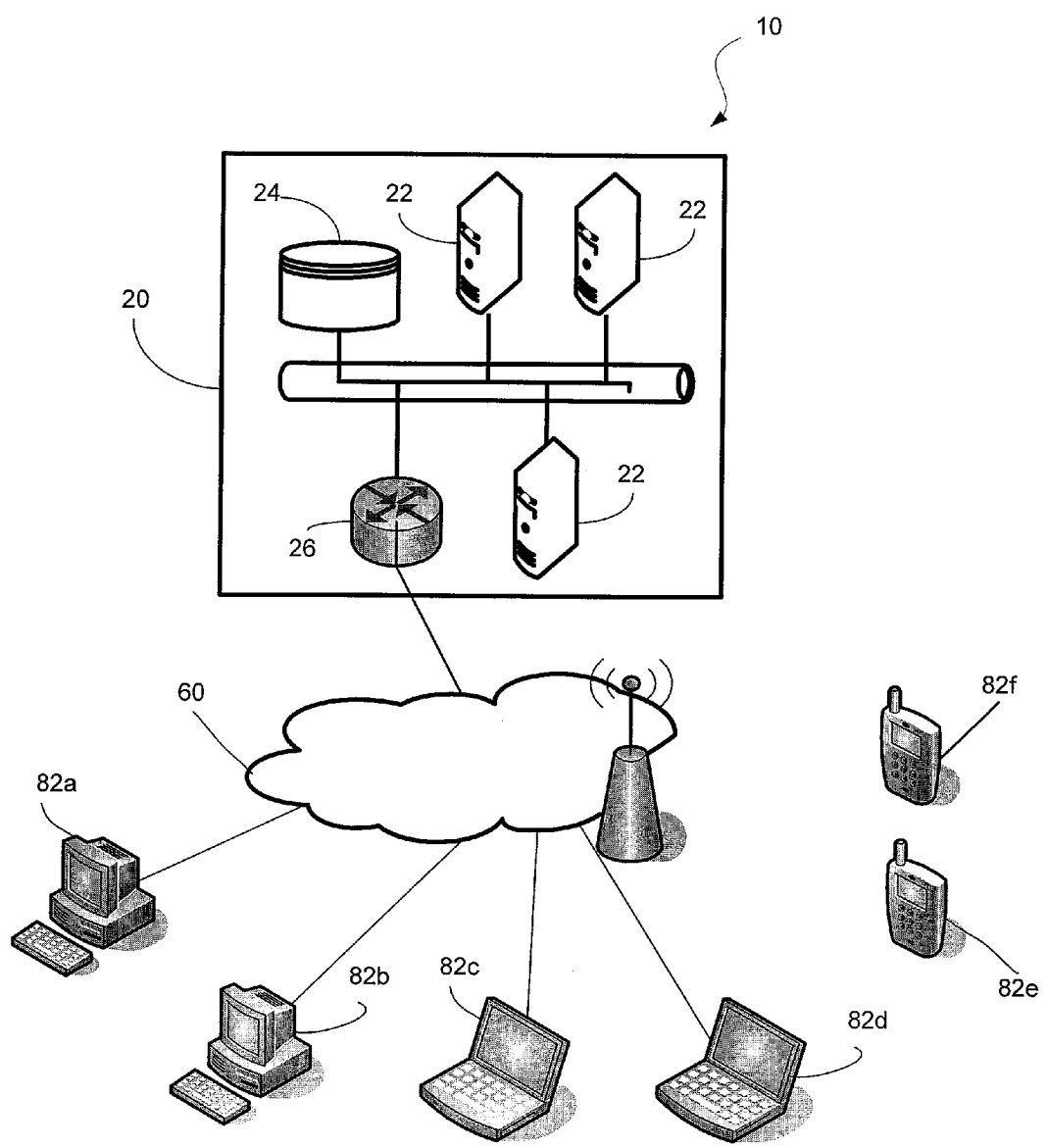
FIG. 1 is a schematic diagram that illustrates an example network environment in which particular implementations of the invention may operate.

As FIG. 1 illustrates, a particular implementation of the invention can operate in a network environment 10 comprising network application hosting site 20, such as an informational web site, social network site and the like. Although FIG. 1 illustrates only one network application hosting site, implementations of the invention may operate in network environments that include multiples of one or more of the individual systems and sites disclosed herein. Client nodes 82 are operably connected to the network environment via a network service provider or any other suitable means.

Network application hosting site 20 is a network addressable system that hosts a network application accessible to one or more users over a computer network. The network application may be an informational web site where users request and receive identified web pages and other content over the computer network. The network application may also be a search platform, an on-line forum or blogging application where users may submit or otherwise configure content for display to other users. The network application may also be a social network application allowing users to configure and maintain personal web pages. The network application may also be a content distribution application, such as Yahoo! Music Engine®, Apple® iTunes®, podcasting servers, that displays available content, and transmits content to users.

Network application hosting site 20, in one implementation, comprises one or more physical servers 22 and content data store 24. The one or more physical servers 22 are operably connected to computer network 60 via a router 26. The one or more physical servers 22 host functionality that provides a network application (e.g., a news content site, etc.) to a user. As discussed in connection with FIG. 2, in one implementation, the functionality hosted by the one or more physical servers 22 may include web or HTTP servers, ad serving systems, geo-targeting systems, and the like. Still further, some or all of the functionality described herein may be accessible using an HTTP interface or presented as a web service using SOAP or other suitable protocols.

Content data store 24 stores content as digital content data objects. A content data object or content object, in particular implementations, is an individual item of digital information typically stored or embodied in a data file or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Structurally, content data store 24 connotes a large class of data storage and management systems. In particular implementations, content data store 24 may be implemented by any suitable physical system including components, such as database servers, mass storage media, media library systems, and the like.

Network application hosting site 20, in one implementation, provides web pages, such as front pages, that include an information package or module describing one or more attributes of a network addressable resource, such as a web page containing an article or product description, a downloadable or streaming media file, and the like. The web page may also include one or more ads, such as banner ads, text-based ads, sponsored videos, games, and the like. Generally, web pages and other resources include hypertext links or other controls that a user can activate to retrieve additional web pages or resources. A user "clicks" on the hyperlink with a computer input device to initiate a retrieval request to retrieve the information associated with the hyperlink or control.

As described in greater detail below, network application hosting site 20 may be configured to deliver, and one or more of client nodes 82 may be configured to receive, social context-based content. Social context-based content may refer to any content (e.g., audio, images, text, video, ringtones, coupons, interactive games, rich media content files, etc.) for which the appearance of the content to a user is based at least on the user's social context (e.g., information regarding the user's social network profile information, the user's preferences, the user's contacts in a social network, and/or information regarding the interaction of such contacts with content previously delivered to the contacts). Also as described in greater detail below, one or more of client nodes 82 may be configured to allow a user to enhance content delivered to the client node, and network application hosting site 20 may be configured to receive and/or store such enhancements to the content.

Figure 2:
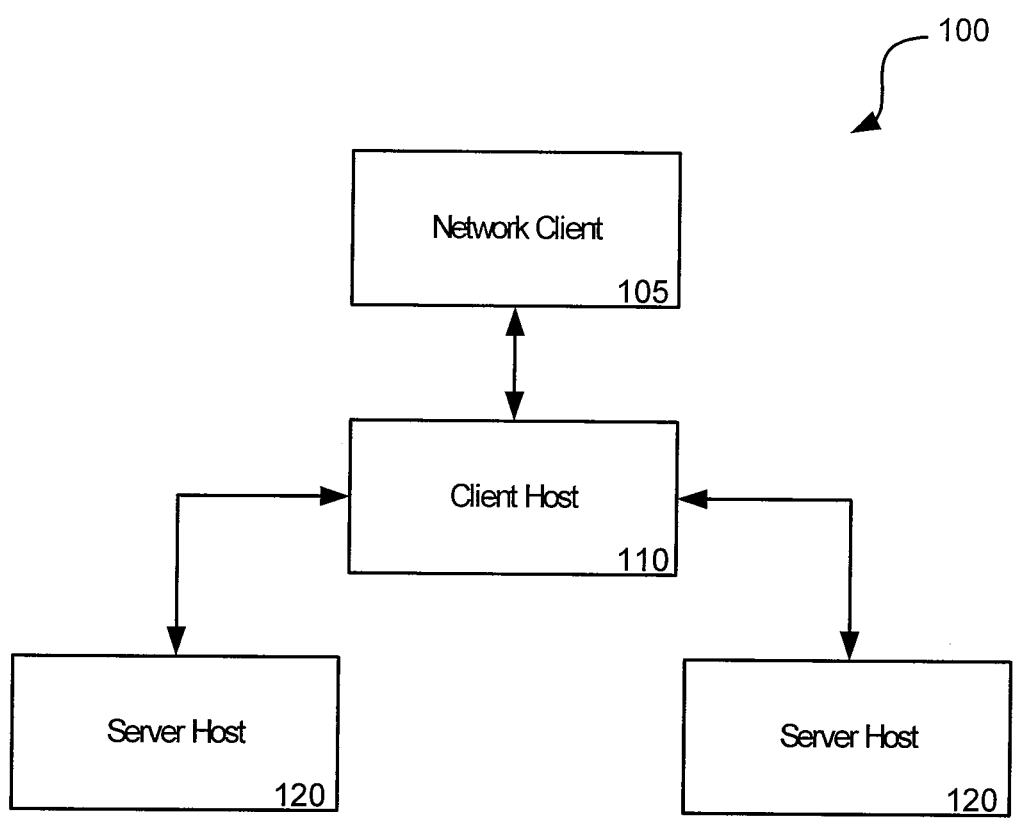
FIG. 2 is a schematic diagram illustrating a client host environment to which implementations of the invention may have application.

FIG. 2 illustrates the functional modules of a client host server environment 100 within network application hosting site 20 according to one particular implementation. As FIG. 2 illustrates, network application hosting site 20 may comprise one or more network clients 105 and one or more client hosts 110 operating in conjunction with one or more server hosts 120. The foregoing functional modules may be realized by hardware, executable modules stored on a computer readable medium, or a combination of both. The functional modules, for example, may be hosted on one or more physical servers 22 and/or one or more client nodes 82.

Network client 105 may be a web client hosted on client nodes 82, a client host 110 located on physical server 22, or a server host located on physical server 22. Client host 110 may be an executable web or HTTP server module that accepts HyperText Transport Protocol (HTTP) requests from network clients 105 acting as a web clients, such web browser client applications hosted on client nodes 82, and serving HTTP responses including contents, such as HyperText Markup Language (HTML) documents and linked objects (images, advertisements, etc.). Client host 110 may also be an executable module that accepts Simple Object Access Protocol (SOAP) requests from one or more client hosts 110 or one or more server hosts 120. In one implementation, client host 110 has the capability of delegating all or part of single or multiple requests from network client 105 to one or more server hosts 120. Client host 110, as discussed above, may operate to deliver a network application, such as an informational web page or an internet search service.

In a particular implementation, client host 110 may act as a server host 120 to another client host 110 and may function to further delegate requests to one or more server hosts 120 and/or one or more client hosts 110. Server hosts 120 host one or more server applications, such as an ad selection server, sponsored search server, content customization server, and the like.

B. Client Nodes & Example Protocol Environment

A client node is a computer or computing device including functionality for communicating over a computer network. A client node may be a desktop computer 82a, 82b, laptop computer 82c, 82d, as well as mobile devices 82e, 82f, such as cellular telephones and personal digital assistants. A client node may execute one or more client applications, such as a web browser, to access and view content over a computer network. In particular implementations, the client applications allow users to enter addresses of specific network resources to be retrieved. These addresses can be Uniform Resource Locators, or URLs. In addition, once a page or other resource has been retrieved, the client applications may provide access to other pages or records when the user "clicks" on hyperlinks to other resources. In some implementations, such hyperlinks are located within web pages and provide an automated way for the user to enter the URL of another page and to retrieve that page. The pages or resources can be data records including as content plain textual information, or more complex digitally encoded multimedia content, such as software programs or other code objects, graphics, images, audio signals, videos, and so forth.

The networked systems described herein can communicate over the network 60 using any suitable communications protocols. For example, client nodes 82a-d, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. Still further, in particular implementations, the information transmitted between hosts may be formatted as HyperText Markup Language (HTML) documents. Other structured document languages or formats can be used, such as XML, and the like.

In some client-server protocols, such as the use of HTML over HTTP, a server generally transmits a response to a request from a client. The response may comprise one or more data objects. For example, the response may comprise a first data object, followed by subsequently transmitted data objects. In one implementation, for example, a client request may cause a server to respond with a first data object, such as an HTML page, which itself refers to other data objects. A client application, such as a browser, will request these additional data objects as it parses or otherwise processes the first data object.

Mobile client nodes 82e-f may use other communications protocols and data formats. For example, mobile client nodes 82e-f, in some implementations, may include mobile web browser. The use of other wireless or mobile device protocol suites are also possible, such as NTT DoCoMo's i-mode wireless network service protocol suites. In addition, the network environment may also include protocol translation gateways, proxies or other systems to allow mobile client nodes 84, for example, to access other network protocol environments. For example, a user may use a mobile client node 82e-f to capture an image and upload the image over the carrier network to a content site connected to the Internet.

C. Example Operation

In a social networking service (e.g., facebook, MySpace, LinkedIn, etc.), each user of the social network may create a network profile (e.g., username, password, and/or biographical information) via a client node 82. For example, a user may access the social network via an application program available at the client node 82 (e.g., a web browser) and/or via a website for the social network. Using client nodes 82, each user may also specify other users in the social network to which the user has a social tie. In this disclosure, the terms "social tie" and "tie" may be used to indicate a social relationship between two users in a social network (e.g., a "friend," "buddy," "connection," "link," etc.), while the term "contact" may be used to indicate any user for which a particular user has a social tie. In addition to a social tie existing based on a declared relationship between users, a social tie may also be derived by the social networking service on the basis of shared interests, biographical information, and/or other common aspects of the users. The social networking application, user biographical information, social ties, and contact information may be hosted at network application hosting site 20. Users using client nodes 82 may access the social networking application via network cloud 60. Once a user's contacts have been identified, a user may be able to access the social networking application website and/or application to view some or all of the profile information of his or her contacts, including, for example, actions performed by the contacts.

In addition, content may be delivered to users using network environment 10 or a similar network environment. For example, content in any suitable form (e.g., audio, images, text, video, ringtones, coupons, interactive games, rich media content files, etc.) may be hosted at network application hosting site 20 or a similar hosting site. Network application hosting site may communicate such content via network cloud 60 to a client node 82 and displayed to a user thereof.

Figures 3, 4, 5:
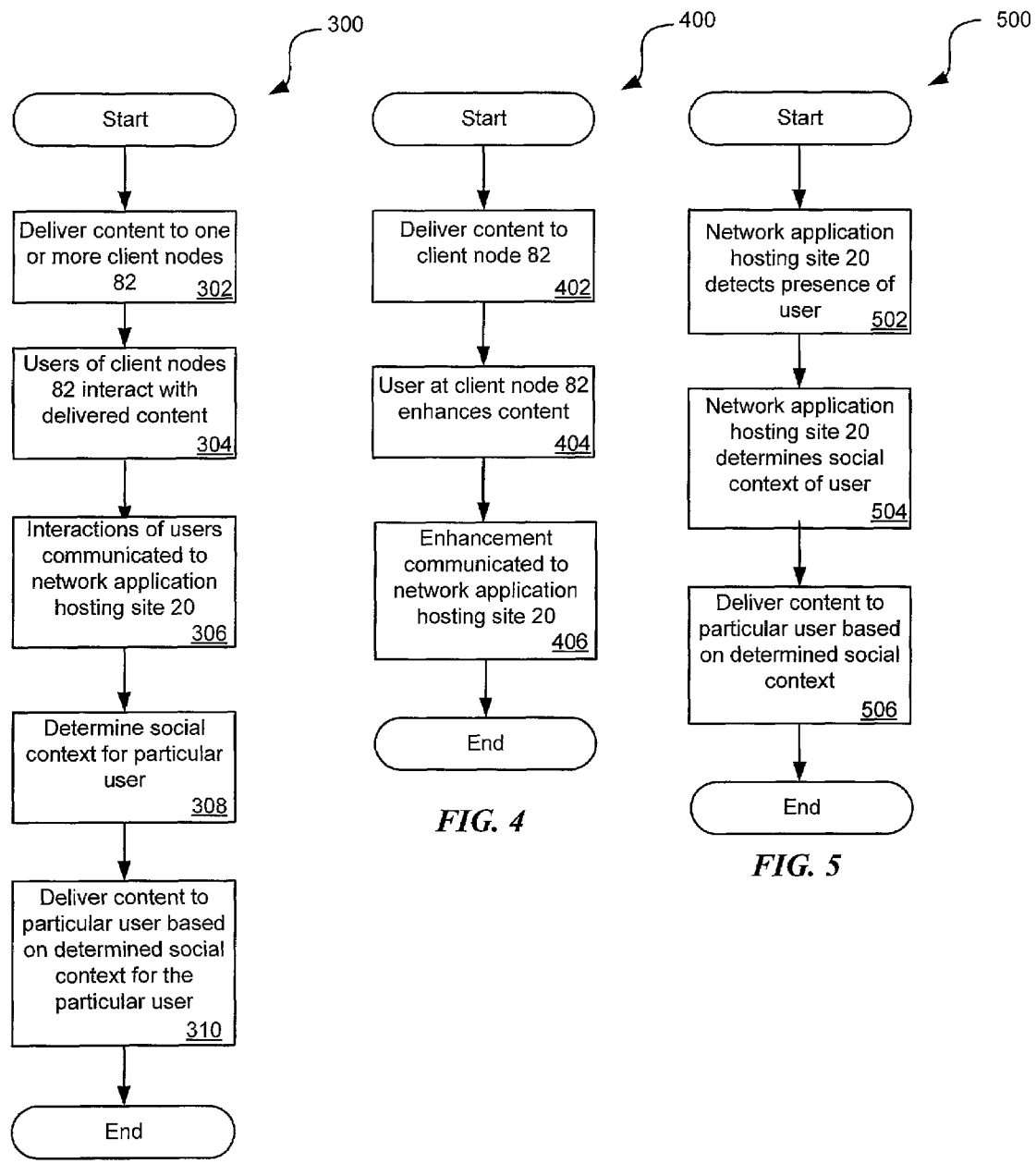
FIG. 3 illustrates a flow chart of an example method that may be implemented to deliver social context-based content to a client node.
FIG. 4 illustrates a flow chart of an example method that may be implemented to create social context-based content.
FIG. 5 illustrates a flow chart of another example method that may be implemented to create and deliver social context-based content.

FIG. 3 illustrates a flow chart of an example method 300 that may be implemented to deliver social context-based content to client node 82. Method 300 may be implemented by a social networking application and/or other application (e.g., a social networking application and/or other application executing on network application hosting site 20).

At step 302, network application hosting site 20 may deliver content (e.g., an advertisement for goods or services) to one or more client nodes 82. In some embodiments, the content may include rich media content (e.g., an Adobe® Flash file) allowing a user at a client node 82 receiving the content to interact with the content.

At step 304, one or more users of client nodes 82 may interact with the delivered content. For example, when delivered to a client node 82, the content may present an option to a user, such as a preferred method of viewing the content (e.g., as a movie, as audio, as an interactive game, etc.), and the user may interact by selecting the preferred viewing method. At step 306, the interactions of the users of the one or more client nodes 82 may be communicated to network application hosting site 20 and/or stored on a data store (e.g., content data store 24).

At step 308, network application hosting site 20 may determine a social context for a particular user. The particular user may or may not be one of the one or more users that received the content at step 302. The social context may comprise a collection of data that may include information regarding the user's social network profile information (e.g., name, schools attended, favorite teams, favorite music, etc.), the user's preferences, the user's contacts in a social network, and/or information regarding the interaction of such contacts with content previously delivered to the contacts of client nodes 82.

At step 310, network application hosting site 20 may deliver content (e.g., content identical or related to the content delivered at step 302) to a user wherein the delivered content is based at least on the determined social context (e.g., based on the particular user's social network profile information, the particular user's preferences, the particular user's social contacts and/or interaction of such contacts with the content).

In addition to delivery of content based on a user's social context, content may also be delivered based on other contextual parameters associated with a user. For example, content may be delivered based on a temporal or time-based context (e.g., certain portions of content may be displayed to a certain user before a certain time, and other portions may be displayed after the certain time). As another example, content may be delivered based on spatial or geographic context (e.g., displayed portions of content may be dependent upon the user's geographical location, as determined by global positioning system (GPS), location in cellular network, Internet Protocol (IP) address, Bluetooth, radio frequency identification (RFID), and/or the user's explicitly provided information). As a further example, portions of content may be delivered based on a behavioral context (e.g., a user's most recently or often-visited websites, a user's currently visited website, etc.).

As a specific example of method 300, the content delivered to one or more users of clients nodes 82 may include a rich media (e.g., Adobe® Flash file) advertisement along with an option to play an interactive game associated with the advertisement or to watch a video associated with the advertisement. Some users may interact by opting to play the interactive game. Accordingly, when the same advertisement is later delivered to another user whose contacts have chosen to play the interactive game, the advertisement may no longer query for a delivery method (e.g., the option of interactive game or video), but may instead automatically display the interactive game. Thus, the content displays the interactive game based on the later user's contacts and the contacts' earlier interaction with the content.

FIG. 4 illustrates a flow chart of an example method 400 that may be implemented to create social context-based content. Method 400 may be implemented by a social networking application and/or other application (e.g., a social networking application and/or other application executing on network application hosting site 20).

At step 402, network application hosting site 20 may deliver content (e.g., an advertisement for goods or services) to a client node 82. In some embodiments, the content may include rich media content (e.g., a Flash file) allowing a user at a client node 82 receiving the content to interact with the content.

At step 404, a user of the client node 82 to which the content was delivered may enhance the delivered content. "Enhancing" the delivered content may refer to any modification, change, addition, deletion, augmentation, annotation, interaction or any other suitable alteration of the content. For example, the user may add an annotation to the content (e.g., "I like this product," "I think those who like the Beatles may also like this product," "I am voting for this candidate because of the reasons in this ad."). As another example, the user may tag the content to indicate which of the user's contacts the user feels may be interested in the content or the subject matter of the content. As a further example, the user may alter the content such that particular video and/or audio portions of the content are replaced with user-added content. As an additional example, a user's interaction with content (e.g., answering a question asked by the content) may also be considered an enhancement, as such interaction may modify metadata associated with the content.

At step 406, information regarding enhancements to the content (e.g., actual enhancements made and/or the identity of the user making such enhancements) may be communicated to network application hosting site 20 and/or stored on a data store (e.g, content data store 24).

FIG. 5 illustrates a flow chart of another example method 500 that may be implemented to deliver social context-based content to a user. Method 500 may be implemented by a social networking application and/or other application (e.g., a social networking application and/or other application executing on network application hosting site 20).

At step 502, network hosting site 20 may detect the presence of a user. The user's presence may be detected in any suitable manner. For example, the presence of the user may be detected by determining the user is logged into a client node 82 and/or a networked application executed thereon. As another example, the presence of the user may be detected by determining that a second client node 82 associated with a user is proximate to another client node 82 (e.g., an advertising kiosk, etc.) to which content may be displayed. The user's proximity may be determined in any suitable manner, including, e.g., GPS, the user's location in cellular network, the user's IP address, and/or the presence of a client node 82 associated with the user within the communication range of Bluetooth, RFID, and/or another short-range communications standard of the second client node 82, for example.

At step 504, network hosting site 20 may determine a social context associated with the user. The determined social context may include information regarding the user's social network profile information (e.g., name, schools attended, favorite teams, favorite music, etc.), a user's preferences, the identity of the user's social contacts, identity of content that may have been enhanced by the user's social contacts (e.g., in a method or manner similar to that of method 400, above), and/or the nature of enhancements by the user's social contacts (e.g., whether enhancements to content made in a method or manner similar to that of 400 include a tag or other reference regarding the user).

At step 506, network hosting site 20 may, based at least on the determined social context, display at least a portion of content (e.g., original content, enhanced content, metadata associated with content) to a user via a client node 82 associated with the user and/or a second client node 82 in proximity to the user's associated client node 82. In addition to delivery of a portion of content based on a user's social context, portions of content may also be delivered based on other contextual parameters associated with a user. For example, content may be delivered based on a temporal or time-based context (e.g., certain portions of content may be displayed to a certain user before a certain time, and other portions may be displayed after the certain time). As another example, content may be delivered based on spatial or geographic context (e.g., displayed portions of content may be dependent upon the user's geographical location, as determined by global positioning system (GPS), location in cellular network, Internet Protocol (IP) address, Bluetooth, radio frequency identification (RFID), and/or the user's explicitly provided information). As a further example, portions of content may be delivered based on a behavioral context (e.g., a user's most recently or often-visited websites, a user's currently visited website, etc.).

In order to illustrate the application of methods 400 and 500, numerous non-limiting examples are set forth below. Such examples are for clarity and exposition only, and shall not limit the applicability of the systems and methods disclosed herein to other examples and/or implementations.

Scenario 1: User A enhances content (e.g., adding a video to a rich media advertisement) and indicates the enhancement is intended to be viewed by User B. The enhanced content is stored on a network hosting site 20. User B comes within proximity to a particular client node 82 upon which the enhanced content may be displayed (e.g., an advertising kiosk including a monitor configured to display the content). After detecting User B's presence (e.g., by detecting that a client node 82 associated with User B is within the communication range of client node 82 associated with the kiosk), the enhanced content may be displayed at the particular client node 82 (e.g., the rich media advertisement displayed to User B may include User A's video).

Scenario 2: User A has User B, User C, and User D as contacts in a social network. Each of Users B, C, and D may download an item of content (e.g., a rich media advertisement) and each make their own enhancements to it (e.g., remix the advertisement, answer a question associated with the advertisement). User A may then be prompted at a client node 82 with an alert and/or other message indicating that other users in User A's social network have enhanced the content and may display at a least a portion of the content and/or the enhancements thereto made by Users B, C, and D. Alternatively, User A may receive via a client node 82 an alert and/or other message that other users closely matching User A's social context, temporal context, spatial context, or behavioral context have enhanced and/or otherwise interacted with the content (e.g., the interactions of earlier users may modify metadata associated with the content, and such metadata regarding the interactions or other elements related to such metadata may be displayed to the user).

Scenario 3: User A approaches a client node 82 and the client node displays content based on User A's social context (e.g., the user's social network profile information, a user's preferences, preferences and profile information regarding the user's contacts, etc.). For example, the content displayed to User A may be customized based on social network profile settings of User A (e.g., a sports apparel advertisement may be customized to include apparel for User A's favorite team) or customized based on social network profile settings of another user in User A's social network. In certain embodiments, certain content (e.g., ringtones, rich media, etc.) may be automatically delivered to User A based on preferences, enhancements, or interactions of other users in User A's social network.

D. Example Computing System Architectures

While the foregoing systems and methods can be implemented by a wide variety of physical systems and in a wide variety of network environments, the client and server host systems described below provide example computing architectures for didactic, rather than limiting, purposes.

Figure 6:
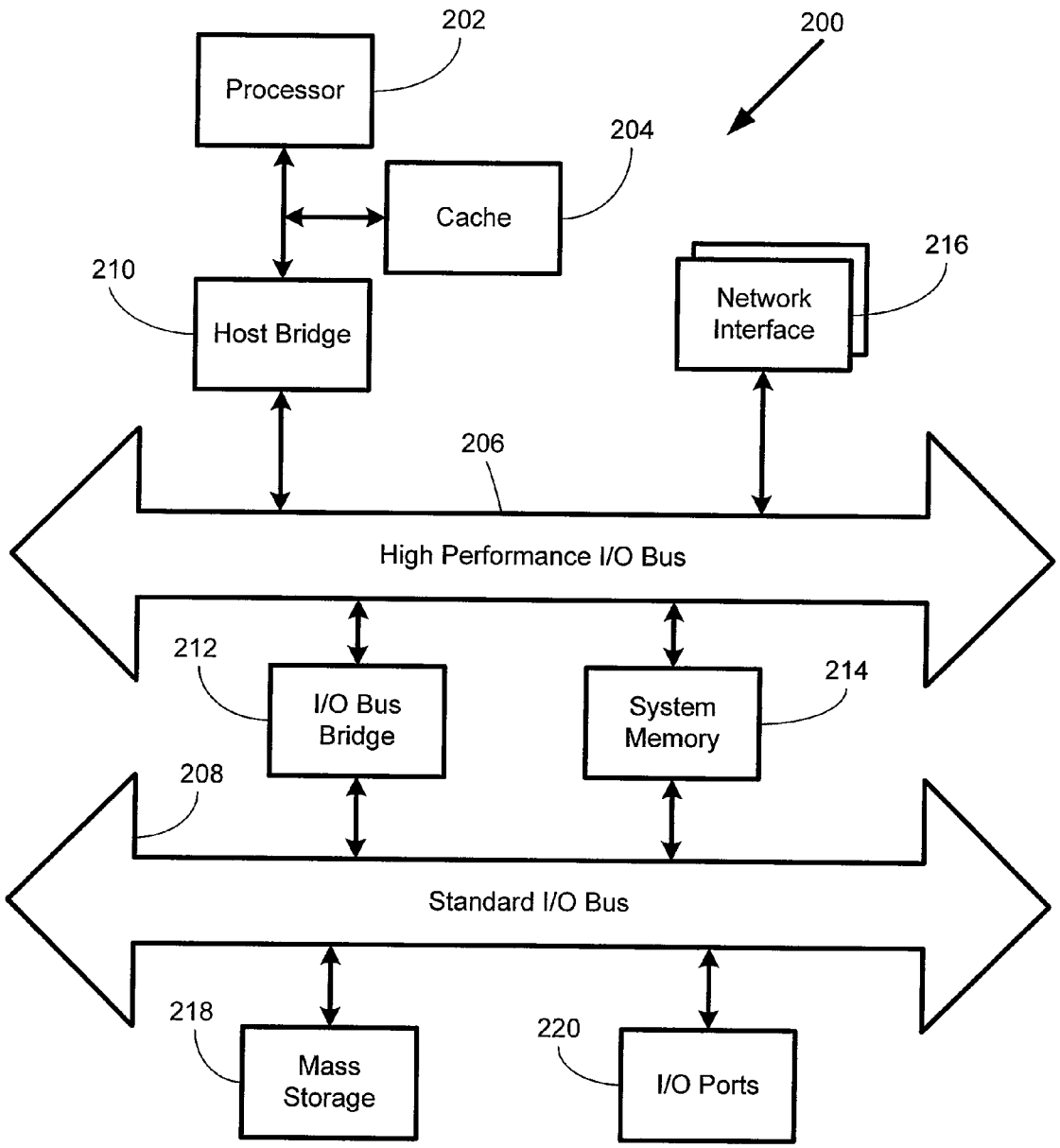
FIG. 6 is a schematic diagram illustrating an example computing system architecture that may be used to implement one or more of physical servers depicted in FIG. 1.

FIG. 6 illustrates an example computing system architecture, which may be used to implement a physical server. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the location server 22, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist, with the components of hardware system 200 being coupled to the single bus. Furthermore, hardware system 200 may include additional components, such as additional processors, storage devices, or memories.

As discussed below, in one implementation, the operations of one or more of the physical servers described herein are implemented as a series of software routines run by hardware system 200. These software routines comprise a plurality or series of instructions to be executed by a processor in a hardware system, such as processor 202. Initially, the series of instructions may be stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system may include a Windows®-based operating system, available from Microsoft Corporation of Redmond, Wash. However, the present invention may be used with other suitable operating systems, such as an Apple Macintosh-based Operating System, available from Apple Computer Inc. of Cupertino, Calif., a UNIX-based operating system, a LINUX-based operating system, and the like. Of course, other implementations are possible. For example, the server functionalities described herein may be implemented by a plurality of server blades communicating over a backplane.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, servers, mass storage devices, disk arrays, and storage area networks (SANs). The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

Figure 7:
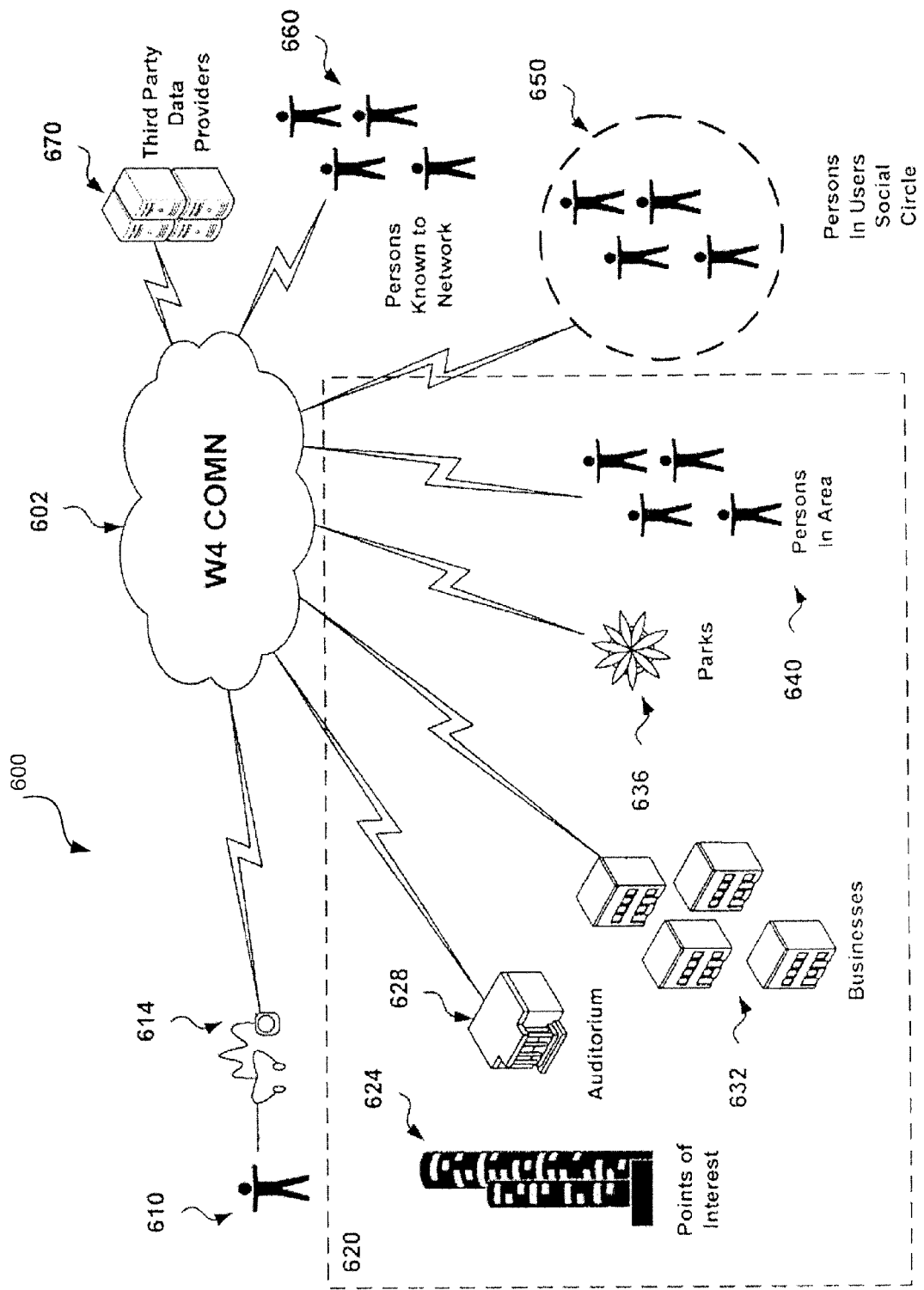
FIG. 7 is a schematic diagram illustrating an example network that may be used to provide context-based context.

FIG. 7 is a schematic diagram illustrating an example system 600 that may be used to provide context-based content in accordance with the present disclosure. In certain embodiments of system 600, system 600 may be used to provide context-based content based on temporal, spatial, social, topical, and/or behavioral data for a plurality of users, devices and locations within system 600. As depicted in FIG. 7, a user 610 may access context-based content from network 602 via a client 614 associated with the user. In certain embodiments, network 602 may be a "W4 communications network" of W4 COMN, which may provide information related to the "Who, What, When and Where" of interactions within system 600.

FIG. 7 illustrates how the entities shown may be defined to a network, for example a W4 COMN. A "W4 Communications Network" or W4 COMN, provides information related to the "Who, What, When and Where" of interactions within the network. Network 602 may interface a collection of users, devices and processes and foster both synchronous and asynchronous communications between users and their associated clients and providing an instrumented network of sensors providing data recognition and collection in real-world environments about any subject, location, or user of network, or any combination thereof. For example, content may be delivered to user 610 based on a geographical area 620 in which user 610 is located or which is otherwise associated with user 610. Such content may also be based on entities present with geographical area 620, such as, for example, tourist attractions and other points of interest 624, auditoriums and other public venues 628, businesses of various types 632, parks and recreation areas 636, and persons 640. In addition, content delivered to a user 610 may be based on other entities known to network 602, including without limitation, persons within the user's social networks 650, other persons known to network 602, and third party data sources 670 which can include free and premium information services which may provide data about other entities and topics, including reviews, ratings, rankings, or other feedback by users, and/or content associated with locations, events, objects, and/or people. Using the methods and systems disclosed herein, network 602 may collect spatial, temporal, social, and/or topical data (including behavioral and interaction data) about such entities that may be used to enhance or otherwise affect content delivered to user 610.

The present invention has been explained with reference to specific embodiments. For example, while embodiments of the present invention have been described as operating in connection with HTML and HTTP, the present invention can be used in connection with any suitable protocol environment. Furthermore, implementations of the invention can be used in systems directed to serving geo-targeted content other than ads to users. Other embodiments will be evident to those of ordinary skill in the art. It is therefore not intended that the present invention be limited, except as indicated by the appended claims.

What is claimed is:

1. A method comprising:
    detecting, by a computing device, the presence of a first user of an online social network;
    delivering, by a computing device, content to the first user, the content allowing enhancement by the first user;
    receiving, by the computing device, one or more enhancements to the content by the first user;
    detecting, by the computing device, the presence of a second user on the social network, the second user different than the first user, the detecting the presence of the second user comprising detecting that a first client node to which the content may be displayed is geographically proximate to a second client node associated with the second user;
    determining, by the computing device, a social context of the second user, the social context comprising data associated with the second user with respect to the social network, the data associated with the second user with respect to the social network comprising data related to an interaction with the particular content by friends or contacts of the second user;
    modifying, by the computing device, the content, the modifying based on the determined social context of the second user and the one or more enhancements to the content by the first user;
    notifying, by the computing device, the second user that the content has been modified by the first user, the notifying comprising displaying at least a portion of the modified content; and
    delivering, by the computing device, the modified content to the second user, the delivering comprising displaying the modified content to the first client node in response to the determination that the first client node is geographically proximate to the second client node.

2. The method of claim 1, wherein the content includes an interactive rich media file.

3. The method of claim 1, wherein the content includes an interactive advertisement.

4. The method of claim 1, wherein the social context includes at least one of:
    information regarding contacts of the second user with respect to the social networks; and
    information regarding enhancements of the content by contacts of the second user with respect to the social network.

5. The method of claim 1, wherein the determined social context indicates that the first user and the second user are contacts with respect to the social network, and the modified content delivered to the second user includes the one or more enhancements of the first user.

6. The method of claim 1, wherein detecting that the first client node is proximate to the second client node is based on at least one of:
    the second client node's geographic location as determined by a global positioning system;
    the second client node's geographic location in a cellular network;
    the second client node's Internet protocol address; and
    the second client node's presence within a communication range of a short-range communication standard associated with the first client node.

7. The method of claim 1, wherein the delivered modified content is based on at least one of a temporal context, a geographical context, and a behavioral context of at least one of the first user and the second user.

8. An apparatus, comprising:
    one or more processors;
    one or more network interfaces;
    a memory for tangibly storing thereon program logic for execution by the processor, the program logic comprising:
        detecting logic executed by the processor for detecting the presence of a first user of an online social network;
        delivering logic executed by the processor for delivering content to the first user via the one or more network interfaces, the content allowing enhancement by the first user;
        receiving logic executed by the processor for receiving via the one or more network interfaces one or more enhancements to the content by the first user;

detecting logic executed by the processor for detecting via the one or more network interfaces the presence of a second user on the social network, the second user different than the first user, the detecting the presence of the second user comprising detecting that a first client node to which the content may be displayed is geographically proximate to a second client node associated with the second user;

determining logic executed by the processor for determining a social context of the second user, the social context comprising data associated with the second user with respect to the social network, the data associated with the second user with respect to the social network comprising data related to an interaction with the particular content by friends or contacts of the second user;

modifying logic executed by the processor for modifying the content, the modifying based on the determined social context of the second user and the one or more enhancements to the content by the first user;

notifying logic executed by the processor for notifying the second user that the content has been modified by the first user, the notifying comprising displaying at least a portion of the modified content; and delivering logic executed by the processor for delivering the modified content to the second user via the one or more network interfaces, the delivering comprising displaying the modified content to the first client node in response to the determination that the first client node is geographically proximate to the second client node.

9. The apparatus of claim 8, wherein the content includes an interactive rich media file.

10. The apparatus of claim 8, wherein the content includes an interactive advertisement.

11. The apparatus of claim 8, wherein the social context includes at least one of:
   information regarding contacts of the second user with respect to the social networks; and
   information regarding enhancements of the content by contacts of the second user with respect to the social network.

12. The apparatus of claim 8, wherein the determined social context indicates that the first user and the second user are contacts with respect to the social network, and the modified content delivered to the second user includes the one or more enhancements of the first user.

13. The apparatus of claim 8, wherein detecting that the first node is proximate to the second client node is based on at least one of:
   the second client node's geographic location as determined by a global positioning system;
   the second client node's geographic location in a cellular network;
   the second client node's Internet protocol address; and
   the second client node's presence within a communication range of a short-range communication standard associated with the first client node.

14. The apparatus of claim 8, wherein the delivered modified content is based on at least one of a temporal context, a geographical context, and a behavioral context of at least one of the first user and the second user.

15. A non-transitory computer readable storage medium comprising computer-executable instructions carried on the computer readable storage medium, the instructions readable by a processor, the instructions, when read and executed, for causing the processor to:
   detect via the one or more network interfaces the presence of a first user of an online social network;
   deliver content to the first user via the one or more network interfaces, the content allowing enhancement by the first user;
   receive via the one or more network interfaces one or more enhancements to the content by the first user;
   detect via the one or more network interfaces the presence of a second user on the social network, the second user different than the first user, the detecting the presence of the second user comprising detecting that a first client node to which the content may be displayed is geographically proximate to a second client node associated with the second user;
   determine a social context of the second user, the social context comprising data associated with the second user with respect to the social network, the data associated with the second user with respect to the social network comprising data related to an interaction with the particular content by friends or contacts of the second user;
   modify the content, the modifying based on the determined social context of the second user and the one or more enhancements to the content by the first user;
   notify the second user that the content has been modified by the first user, the notifying comprising displaying at least a portion of the modified content; and
   deliver the modified content to the second user via the one or more network interfaces, the delivering comprising displaying the modified content to the first client node in response to the determination that the first client node is geographically proximate to the second client node.

16. The non-transitory computer readable storage medium of claim 15 wherein the social context includes at least one of:
   information regarding contacts of the second user with respect to the social networks; and
   information regarding enhancements of the content by contacts of the second user with respect to the social network.

17. The non-transitory computer readable storage medium of claim 15, wherein the determined social context indicates that the first user and the second user are contacts with respect to the social network, and the modified content delivered to the second user includes the one or more enhancements of the first user.

* * * * *